(12) United States Patent
Agarwal et al.

(10) Patent No.: US 7,586,912 B2
(45) Date of Patent: Sep. 8, 2009

(54) TECHNIQUES FOR EXCHANGING DHCP INFORMATION AMONG DHCP RELAY AGENTS AND DHCP SERVERS

(75) Inventors: Anand Agarwal, Kundalahalli (IN); Krishna Sundaresan, Indiranagar (IN); Anshul Tanwar, Adugodi (IN); Indrajanti Sukiman, Sunnyvale, CA (US); Ralph Droms, Westford, MA (US); Richard Johnson, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 11/495,273

(22) Filed: Jul. 28, 2006

(65) Prior Publication Data

US 2008/0025299 A1 Jan. 31, 2008

(51) Int. Cl.
*H04L 12/56* (2006.01)

(52) U.S. Cl. ..................................................... 370/389

(58) Field of Classification Search ......... 370/254–258, 370/389, 401
See application file for complete search history.

(56) References Cited

U.S. PATENT DOCUMENTS 5,987,011 A 11/1999 Toh
6,289,377 B1 9/2001 Lalwaney et al.
6,542,491 B1 * 4/2003 Tari et al. .................... 370/401
6,957,276 B1 10/2005 Bahl
7,139,818 B1 11/2006 Kinnear, Jr. et al.
7,152,117 B1 12/2006 Stapp
2001/0043616 A1 11/2001 Hild et al.
2002/0162029 A1* 10/2002 Allen et al. .................. 713/202
2004/0165592 A1* 8/2004 Chen et al. ................ 370/395.1
2004/0213234 A1* 10/2004 Koch et al. .................. 370/392
2005/0220099 A1* 10/2005 Igarashi ...................... 370/389
2005/0271049 A1 12/2005 Jain et al.
2007/0081523 A1* 4/2007 Mishra ........................ 370/352

* cited by examiner

*Primary Examiner*—Hassan Kizou
*Assistant Examiner*—Joshua Smith
(74) *Attorney, Agent, or Firm*—BainwoodHuang

(57) ABSTRACT

A technique involves exchanging DHCP relay agent information with a DHCP server. In particular, the technique involves receiving a DHCP message en route from a DHCP client to the DHCP server. The DHCP message includes (i) a non-option portion having a client identifier identifying the DHCP client and (ii) an option portion having first relay agent information added to the DHCP message by a first relay agent. The technique further involves modifying the option portion of the DHCP message to simultaneously include both the first relay agent information added by the first relay agent and second relay agent information from a second relay agent. The technique further involves sending the DHCP message with the modified option portion to the DHCP server. Accordingly, the DHCP server is capable of receiving relay agent information from multiple relay agents and assigning an address to the DHCP client based on this input.

24 Claims, 6 Drawing Sheets

TECHNIQUES FOR EXCHANGING DHCP INFORMATION AMONG DHCP RELAY AGENTS AND DHCP SERVERS

BACKGROUND

The Dynamic Host Configuration Protocol (DHCP) provides an alternative to static IP addressing by enabling automatic configuration of IP-related parameters when a DHCP client becomes active on a network. In particular, DHCP enables a DHCP server to assign an IP address to the DHCP client, e.g., from a pool of unused and available IP addresses. A description of DHCP is provided in a publication entitled "RFC 2131—Dynamic Host Configuration Protocol" by R. Droms, Bucknell University, dated March 1997, the teachings of which are hereby incorporated by reference in their entirety.

In some situations, DHCP relay agents convey DHCP messages between DHCP clients and DHCP servers. For example, suppose that a DHCP client is on Subnet A and a DHCP server is on Subnet B which is separated from Subnet A by a router. In this situation, the router can be configured to run a DHCP relay agent which forwards the DHCP messages between the subnets, e.g., the DHCP relay agent can forward a DHCPDISCOVER message broadcasted on Subnet A by the DHCP client to the DHCP server on Subnet B, and so on.

A "Relay Agent Information" option (i.e., option code 82) is available which enables a DHCP relay agent to insert a DHCP option with relay agent information onto a DHCP message sent from a DHCP client to a DHCP server. The DHCP server can then use this relay agent information during the process of assigning an IP address to the DHCP client. In accordance with the protocol, the DHCP server echoes the DHCP option back to the DHCP relay agent when providing a response to the DHCP message thus enabling the DHCP relay agent to use the same relay agent information when conveying the response back to the DHCP client. For example, a DHCP relay agent terminating a switched or permanent circuit can use the echoed relay agent information to forward the response back to the proper circuit.

SUMMARY

Unfortunately, there are deficiencies to the above-described conventional DHCP relay agent mechanism. For example, the conventional DHCP relay agent mechanism allows each DHCP message to include only one "Relay Agent Information" option thus limiting each DHCP message to information from a single DHCP relay agent. This limitation is not convenient for certain network configurations.

For instance, suppose that a DHCP client connects to a DHCP server through a first relay agent running on a Digital Subscriber Line Multiplexer (DSLAM) of an Internet Service Provider (ISP) and a second relay agent running on a Broadband Remote Access Server (BRAS) of a network carrier. In this situation, when the DHCP server receives a DHCPDISCOVER from the DHCP client, it would be useful for the DHCP server to obtain relay agent information from the DSLAM in order to authenticate the message. Additionally, it would be useful for the DHCP server to obtaining relay agent information from the BRAS in order to assign an IP address to the DHCP client from an appropriate IP address pool (e.g., from an address pool associated with the particular ISP).

However, the second relay agent running on the BRAS is currently limited to only a few conventional "Relay Agent Information" option functions. In particular, the second relay agent can "keep" any relay agent information (e.g., VPI/VCI information from the DSLAM) added to the DHCPDISCOVER message by the first relay agent and thus enable the DHCP server to properly authenticate the DHCPDISCOVER message. Alternatively, the second relay agent can "replace" any relay agent information added to the DHCPDISCOVER message by the first relay agent with relay agent information from the second relay agent (e.g., ISP information from the BRAS) and thus enable the DHCP server to identify the appropriate IP address pool from which to assign an IP address. Unfortunately, the second relay agent cannot simultaneously (i) maintain the relay agent information from the first relay agent within the DHCPDISCOVER message as well as (ii) add relay agent information from the second relay agent information to the DHCPDISCOVER message.

In the Internet Engineering Task Force's version of Internet Protocol version 6 (IPv6), the IPv6 DHCP relay agent will have the capability to encapsulate an entire DHCP message and other information as a Relay Agent Information option of another DHCP message. As such, an IPv6 DHCP relay agent will be able to receive a first DHCPDISCOVER message having a Relay Agent Information option from an upstream DHCP relay agent, and forward on a second DHCPDISCOVER message containing the entire first DHCPDISCOVER message and its own relay agent information as a payload which is encapsulated within a Relay Agent Information option of the second DHCPDISCOVER message.

Based on the above, there is no still solution available in Internet Protocol version 4 (IPv4). Furthermore, for IPv6, an entire first DHCP message will be encapsulated as a payload in a second DHCP message.

In contrast to the above-described approaches, improved techniques for exchanging DHCP relay agent information involve adapting a DHCP message to include an option portion having both relay agent information from a first relay agent and other relay agent information from a second relay agent. Such techniques enable a DHCP server to receive relay agent information from multiple relay agents and assign an IP address to a DHCP client based on this input (i.e., relay agent information from multiple DHCP relay agents). Accordingly, the DHCP process is capable of effectively and efficiently assigning IP addresses in a variety of new situations, e.g., to a DHCP client separated from a DHCP server by a DSLAM device and a BRAS device based on data from both the DSLAM and BRAS devices.

One embodiment is directed to a technique for exchanging DHCP relay agent information with a DHCP server from a relay agent's perspective. This technique involves receiving a DHCP message en route from a DHCP client to the DHCP server. The DHCP message includes (i) a non-option portion having a client identifier identifying the DHCP client and (ii) an option portion having first relay agent information added to the DHCP message by a first relay agent. The technique further involves modifying the option portion of the DHCP message to simultaneously include both the first relay agent information added by the first relay agent and second relay agent information from a second relay agent. The technique further involves sending the DHCP message with the modified option portion to the DHCP server. Accordingly, the DHCP server will be able to process the DHCP message with data from both the first and second relay agents.

Another embodiment is directed to exchanging DHCP relay agent information from a DHCP server's perspective. This technique involves receiving a DHCP message from a DHCP client through multiple DHCP relay agents. The DHCP message includes (i) a non-option portion having a client identifier identifying the DHCP client and (ii) an option portion having first relay agent information added to the DHCP message by a first relay agent and second relay agent information added to the DHCP message by a second relay agent. This technique further involves generating another DHCP message based on both the first relay agent information and the second relay agent information, and sending the other DHCP message to the DHCP client through the multiple DHCP relay agents. As an example of the DHCP server processing that may occur, the DHCP server may provide, as the other DHCP message, a DHCP response assigning an address to the DHCP client based on the second relay agent information (e.g., based on ISP information from a BRAS). The DHCP server not only includes the second relay agent information in the DHCP response (i.e., the ISP information) but also includes the first relay agent information (e.g., VPI/VCI information from a DSLAM) to enable proper forwarding of the DHCP response back to the DHCP client.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for exchanging DHCP relay agent information between DHCP relay agents and servers. Such techniques involve adapting a DHCP message to include an option portion having both relay agent information from a first relay agent and other relay agent information from a second relay agent. Such techniques enable a DHCP server to receive relay agent information from multiple relay agents and assign an IP address to a DHCP client based on this input. Accordingly, the DHCP process is capable of effectively and efficiently assigning IP addresses in a variety of new situations, e.g., to a DHCP client separated from a DHCP server by a DSLAM device and a BRAS device.

Figure 1:
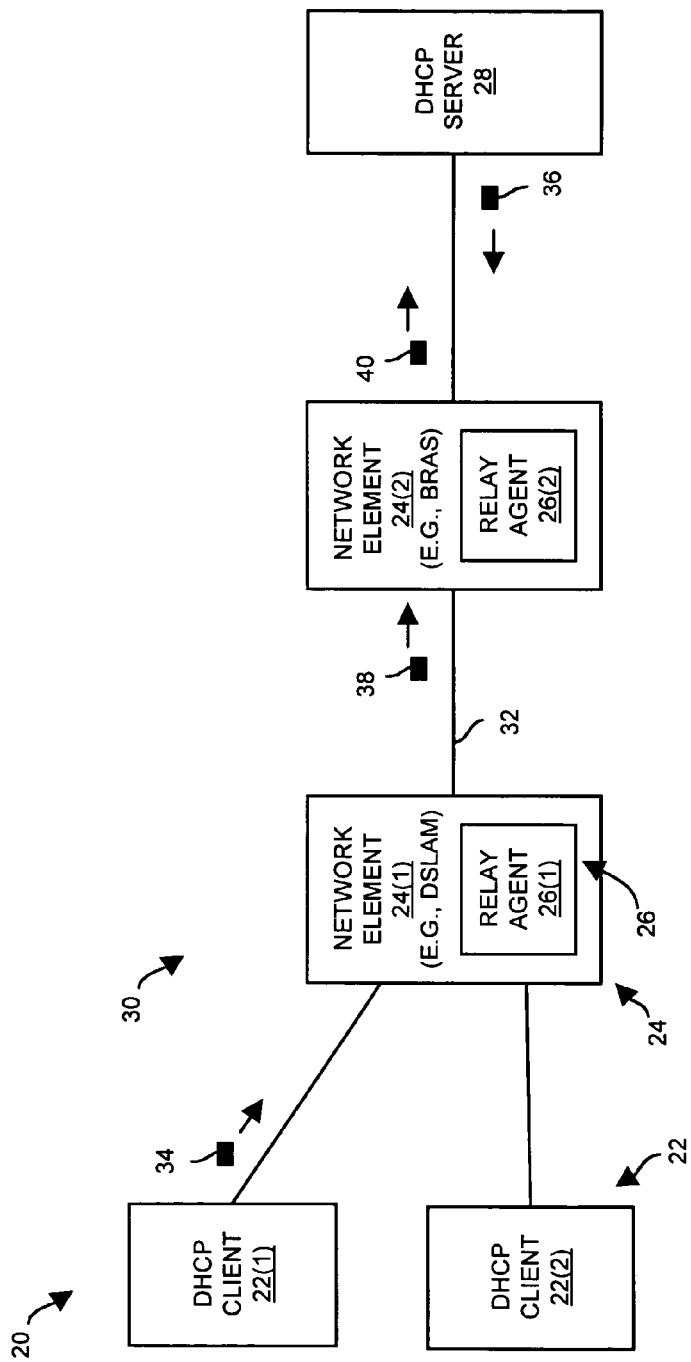
FIG. 1 is a block diagram of a system which is suitable for exchanging DHCP relay agent information between multiple DHCP relay agents and a DHCP server.

FIG. 1 shows a system 20 which enables exchange of relay agent information between multiple DHCP relay agents and a DHCP server. The system 20 includes multiple DHCP clients 22(1), 22(2), . . . (collectively, DHCP clients 22), network elements 24(1), 24(2), . . . (collectively, network elements 24) having respective DHCP relay agents 26(1), 26(2), . . . (collectively, DHCP relay agents 26), and a DHCP server 28. The DHCP clients 22, the DHCP relay agents 26 and the DHCP server 28 are configured to communicate with each other through a communications network 30 which is formed by the network elements 24 and a supporting communications fabric 32 (e.g., copper wire, fiber optic cable, wireless medium, related data communications devices, combinations thereof, etc.). It should be understood that other components can be considered to belong to the network 30 as well such as the clients 22 and the server 28.

By way of example only, the network element 24(1) which runs DHCP relay agent 26(1) is shown as a DSLAM device, and the network element 24(2) which runs DHCP relay agent 26(2) is shown as a BRAS device. Furthermore, in this example, the DHCP clients 22 are subscriber edge devices (e.g., residential home computers for VPI/VCI) and the DHCP server 28 is a carrier-style device (e.g., a carrier-style server offered by a manufacturer such as Sun Microsystems of Santa Clara, Calif., etc.).

During operation, the DHCP clients 22 are configured to obtain and renew IP network addresses from the DHCP server 28. In particular, the DHCP clients 22 are configured to output DHCP client messages 34 (e.g., DHCPDISCOVER, DHCPREQUEST, etc.) to the DHCP server 30 through the communications network 30. The DHCP server 28 is configured to respond to the DHCP client messages 34 from the DHCP clients 22 with DHCP server messages 36 (e.g., DHCPOFFER, DHCPACK, etc.) through the communications network 30. Some or all of these messages between the DHCP clients 22 and the DHCP server 28 may be forwarded by the relay agents 26. In this manner, IP addresses are robustly and reliably assigned and managed within the system 20.

It should be understood that, in the event that the DHCP relay agent 26(2) of the network element 24(2) receives a DHCP client message 34 which already contains relay agent information from another DHCP relay agent (e.g., shown in FIG. 1 as block 38 entering the network element 24(2) from the network element 24(1)), the DHCP relay agent 26(2) is capable of including its own relay agent information within the DHCP client message 34 without supplanting the relay agent information already contained in the DHCP client message 34. Accordingly, the initial relay agent information from the upstream DHCP relay agent 26(1) is not lost. Rather, when the DHCP client message 34 leaves the network element 24(2) en route to the DHCP server 28, the DHCP client message 34 (shown in FIG. 1 as block 40) now includes relay agent information from multiple relay agents 26. As a result, the DHCP server 28 is capable of processing the DHCP client message 34 based on the relay agent information from the multiple relay agents 26. Further details will now be provided with reference to FIG. 2.

Figure 2:
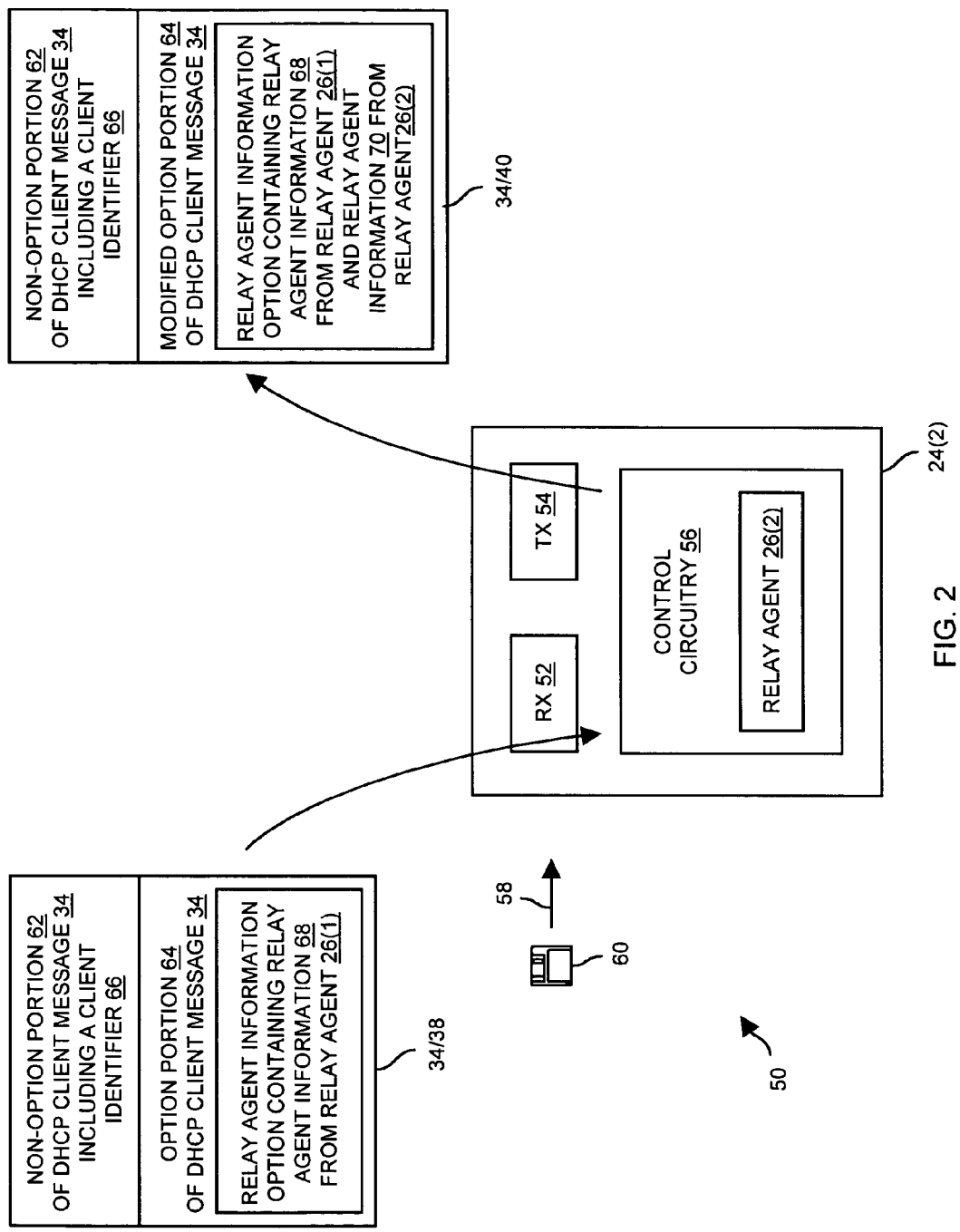
FIG. 2 is a block diagram of a particular network element of the DHCP system of FIG. 1.

FIG. 2 is a block diagram 50 of the network element 24(2). As shown in FIG. 2, the network element 24(2) includes a receiver 52, a transmitter 54, and control circuitry 56 coupled to the receiver 52 and the transmitter 54. The control circuitry 56 is configured to operate as the DHCP relay agent 26(2) among other things.

In some arrangements, the control circuitry 56 includes a processor and memory in order to execute a software application 58 (illustrated by the arrow 58 in FIG. 2) to enable the control circuitry 56 to perform DHCP relay agent operations. In these arrangements, one or more computer program products 60 deliver the application 58 to the network element 24(2) from an external source. Although the computer program product 60 is illustrated as a diskette by way of example only, a variety of communications and storage media are suitable for use (e.g., a set of CD-ROMs, tapes, memory cards or sticks, network downloads, propagated signals, combinations thereof, etc.).

Additionally, in some arrangements, the control circuitry 56 is configured to perform a variety of data communications tasks beyond DHCP operations (e.g., tasks relating to the network element 24(2) operating as a router, a switch, a bridge, a hub, etc.). For these arrangements, the receiver 52 and transmitter 54 form a portion of a network interface that enables the control circuitry 56 to receive and send data through multiple ports. Recall that, in the earlier set forth example, the network element 24(2) is configured to operate as a BRAS device which conveys DHCP communications between a DSLAM device (i.e., the network element 24(1)) and a carrier-style device (i.e., the DHCP server 28).

During operation of the network element 24(2), the control circuitry 56 (operating as the DHCP relay agent 26(2)) is configured to receive, through the receiver 52, a DHCP client message 34 en route from a DHCP client 22 to the DHCP server 28 (e.g., see the DHCP client 22(1) in FIG. 1). As shown in FIG. 2, the DHCP client message 34 includes a non-option portion 62 and an option portion 64.

The non-option portion 62 includes a DHCP client identifier 66 which identifies the DHCP client 22. Typically, the DHCP client identifier 66 is a client hardware address and is stored in the "chaddr" field of the DHCP message 34.

Additionally, the option portion 64 includes relay agent information 68 which was added to the DHCP message 34 by the DHCP relay agent 26(1) which is upstream from the network element 24(2) (e.g., also see FIG. 1). Typically, the relay agent information 68 is data which was not part of the original DHCP client message 34 from the DHCP client 22, but was added by the DHCP relay agent 26(1) as part of the "options" field of the DHCP client message 34. A description of DHCP options is provided in a publication entitled "RFC 2132—DHCP Options and BOOTP Vendor Extensions" by S. Alexander and R. Droms, dated March 1997, the teachings of which are hereby incorporated by reference in their entirety. In the context of the earlier-provided example, the relay agent information 68 may include VPI/VCI information which the DHCP server 28 echoes in the DHCP server message 36 thus enabling the upstream relay agent 26(1) (i.e., running within a DSLAM device) to correctly forward the DHCP server message 36 to the proper DHCP client 22.

Once the relay agent 26(2) receives the DHCP client message 34, the relay agent 26(2) is configured to modify the option portion 64 of the DHCP client message 34 to simultaneously include both the first relay agent information 68 added by the first relay agent and its own relay agent information 70 (i.e., second relay agent information). The relay agent 26(2) is then configured to send, through the transmitter 54, the DHCP message 34 which is labeled with reference numeral 40 with the modified option portion 64 to the DHCP server 28. In the context of the earlier-provided example, the relay agent information 70 includes ISP information from a BRAS device thus enabling the DHCP server 28 to offer an IP address to the DHCP client 22 based on the ISP information (e.g., the DHCP server 28 can perform reliable authorization and authentication based on the relay agent information 70). Further details will now be provided with reference to FIG. 3.

Figure 3:
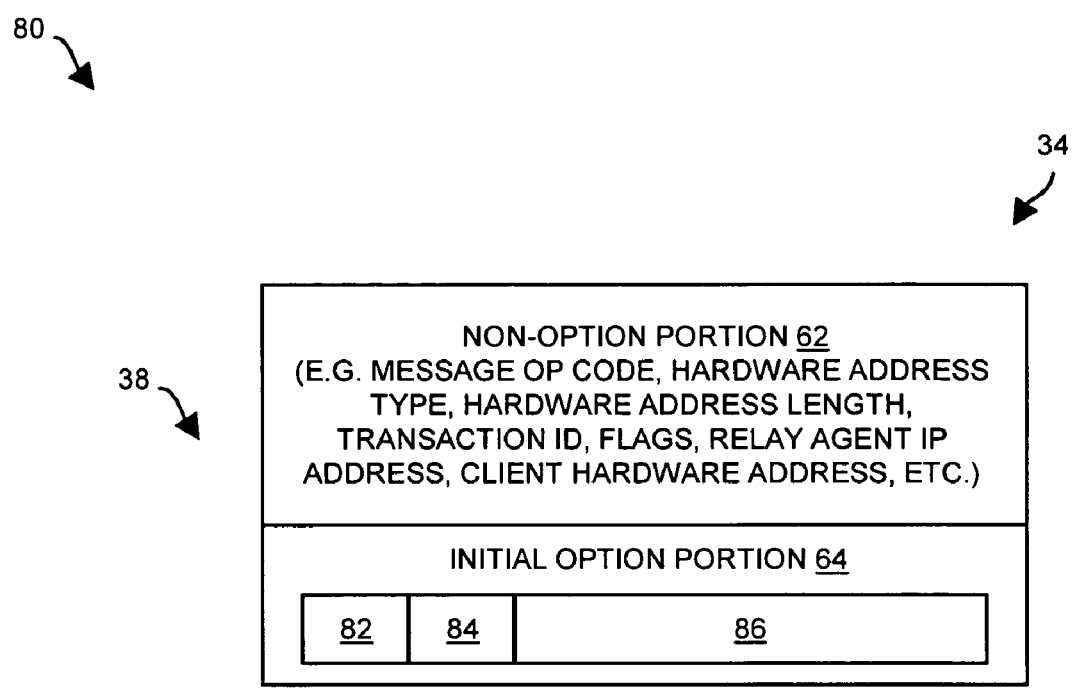
FIG. 3 is a block diagram of a format for a DHCP message received by the network element of FIG. 2.

FIG. 3 is a format 80 for the DHCP client message 34 which is transmitted from the upstream network element 24(1) and received by the network element 24(2) (also see reference numeral 38 in FIGS. 1 and 2). As shown in FIG. 3, the non-option portion 62 of the DHCP client message 34 includes a variety of fields configured to hold various items of information such as a message operation code, a hardware address type, a hardware address length, and so on. A thorough description of the various fields is provided in the earlier-mentioned publication entitled "RFC 2131—Dynamic Host Configuration Protocol" (e.g., see section 2 entitled "Protocol Summary").

The option portion 64 of the DHCP client message 34 includes a code field 82, a length field 84, and an additional section 86. In the case of the Relay Agent Information Option, the code field 82 stores the number "82", the length field 84 stores the number of octets in the agent information field, and the additional section 86 stores the relay agent information. A detailed description of the Relay Agent Information Option is provided in a publication entitled "RFC 3046—DHCP Relay Agent Information Option" by M. Patrick, dated January 2001, the teachings of which are hereby incorporated by reference in their entirety.

In the context of the earlier-provided example, it should be understood that the field 86 stores VPI/VCI information from the DSLAM device, i.e., the network element 24(1). As will be explained in further detail shortly, this VPI/VCI information will be echoed by the DHCP server 28 in the DHCP server message 36 so that the DSLAM device receives this VPI/VCI information and so that the DSLAM device can use this VPI/VCI information to steer the DHCP server message 36 to the proper DHCP client 22. Further details will now be provided with reference to FIG. 4.

Figure 4:
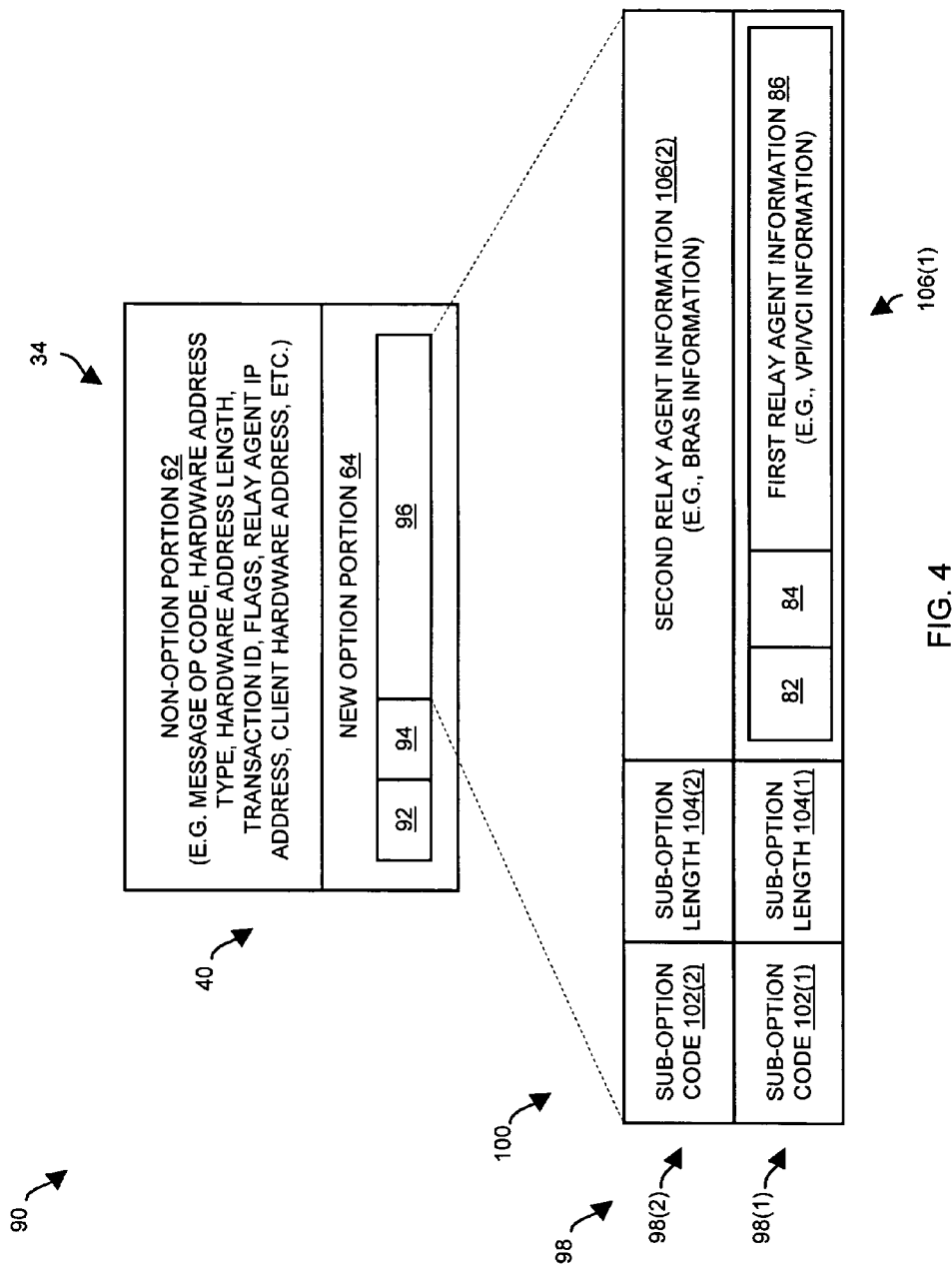
FIG. 4 is a block diagram of a format for a DHCP message transmitted by the network element of FIG. 2.

FIG. 4 is a format 90 for the DHCP client message 34 which is transmitted from the network element 24(2) to the DHCP server 28 (also see reference numeral 40 in FIGS. 1 and 2). As shown in FIG. 4, the non-option portion 62 of the format 90 for the DHCP message 34 includes the same fields as the earlier-provided format 80 of FIG. 3. However, in contrast to the format 80 of FIG. 3, the option portion 64 of the format 90 is configured to include relay agent information from multiple DHCP relay agents 26. Here, when the DHCP relay agent 26(2) processes the DHCP client message 34 en route from the originating DHCP client 22 to the DHCP server 28, the DHCP relay agent 26(2) provides a new Relay Agent Information Option in place of the initial Relay Agent Information Option from the DHCP relay agent 26(1). This new Relay Agent Information Option is formed by a code field 92 for storing an option code, a length field 94 for storing a number of octets of the option, and an additional sub-option section 96 which includes multiple sub-options 98(1), 98(2) (collectively, sub-options 98).

As shown in the expanded view 100 of FIG. 4, the first sub-option 98(1) includes a sub-option code field 102(1), a sub-option length field 104(1) and a sub-option relay agent information field 106(1). Similarly, the second sub-option 98(2) includes a sub-option code field 102(2), a sub-option length field 104(2) and a sub-option relay agent information field 106(2).

The new Relay Agent Information Option from the DHCP relay agent 26(2) is stored in the sub-option 98(2). Additionally, the initial Relay Agent Information Option from the DHCP relay agent 26(1) is stored in the sub-option 98(1). In particular, the sub-option relay agent information field 106(1) is configured to store the entire Relay Agent Information Option from the DHCP relay agent 26(1). That is, when the DHCP relay agent 26(2) transmits the DHCP message 34 to the DHCP server 28, the DHCP relay agent 26(2) is configured to place, within the field 106(1) of the sub-option 98(1) the following information from the initial option portion (also see FIG. 3): the code from the code field 82, the number of octets from the length field 84 and the relay agent information from the relay agent information field 86 of the initial Option 82 provided by the upstream DHCP relay agent 26(1). In contrast to IPv6, only the Relay Agent Information Option is packaged within the sub-option relay agent information field 106(1).

As an alternative to storing the multiple Relay Agent Information Options in respective sub-options 98, the multiple Relay Agent Information Options can be stored in a single sub-option in an integrated manner. That is, information from multiple DHCP relay agents 26 is embedded within a single sub-option relay agent information field. Such an arrangement has a block diagram form similar to that shown in FIG. 3 except that multiple Relay Agent Information Options are contained within the field 86. In either arrangement, the option portion 64 of the format 90 is well-configured to simultaneously hold multiple Relay Agent Information Options.

In the context of the earlier-provided example, it should be understood that the field 102 stores the entire Relay Agent Information Option (e.g., "DHCP Option 82") which is the VPI/VCI information from the DSLAM device (i.e., the network element 24(1)). As a result, the DHCP server 28 will echo this information with the DHCP server message 36 back to the DSLAM device so that, when the DSLAM device receives this VPI/VCI information, the DSLAM device can use this VPI/VCI information to steer the DHCP server message 36 to the proper DHCP client 22. Further details will now be provided with reference to FIG. 5.

Figure 5:
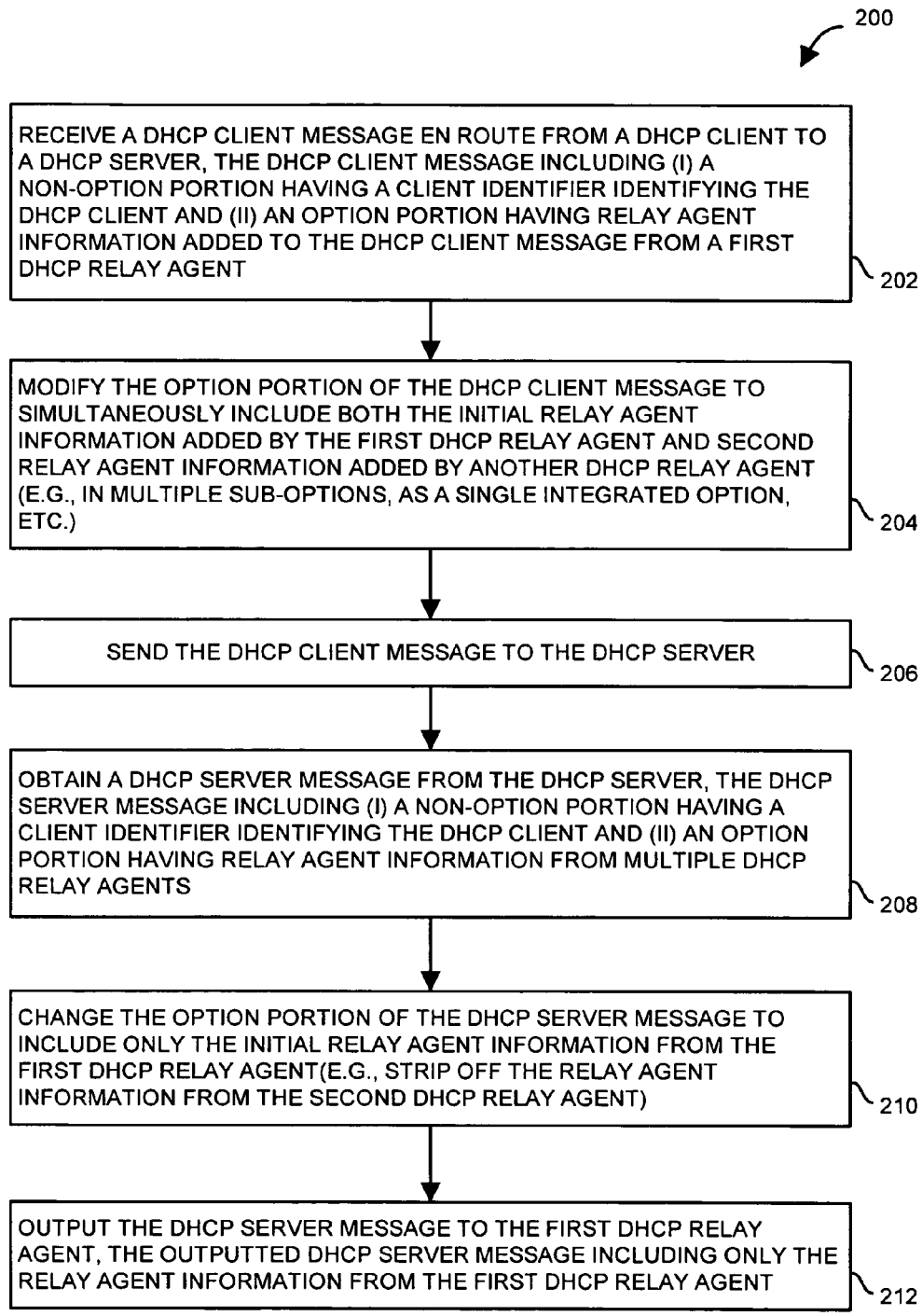
FIG. 5 is a flowchart illustrating a procedure which is performed by a DHCP relay agent of the network element of FIG. 2.

FIG. 5 is a flowchart illustrating a procedure 200 which is performed by the DHCP relay agent 26(2) of the network element 24(2). In step 202, the DHCP relay agent 26(2) receives the DHCP client message 34 en route from a DHCP client 22 to the DHCP server 28. As shown in FIG. 3, the DHCP client message 34 includes a non-option portion 62 having a client identifier identifying the DHCP client 22 as well as an option portion 64 having relay agent information added to the DHCP client message 34 by the relay agent 26(1).

In step 204, the DHCP relay agent 26(2) modifies the option portion 64 of the DHCP client message 34 to simultaneously include both relay agent information added by the relay agent 26(1) and its own relay agent information. In some arrangements, this relay agent information from multiple relay agents is stored in respective sub-options 98 as shown in FIG. 4. In other arrangements, this relay agent information from multiple relay agents is stored as a single option, i.e., the DHCP relay agent 26(2) integrates the relay agent information from the multiple relay agents 26 into a single sub-option of a new Relay Agent Information Option which replaces the initial Relay Agent Information Option of the DHCP client message 34.

In step 206, the DHCP relay agent 26(2) sends the DHCP client message 34 with the modified option portion 64 to the DHCP server 28. Accordingly, when the DHCP server 28 receives the DHCP client message 34, the DHCP server 28 will be able to process the DHCP client message 34 with both Relay Agent Information Options.

At this point, it should be understood that the DHCP server 28 echoes both Relay Agent Information Options in the DHCP server message 36 in compliance with the DHCP standard. Similarly in compliance with the DHCP standard and as will now be explained, the DHCP relay agents 26 must remove the added Relay Agent Information Options which they added. Accordingly, in step 208, the DHCP relay agent 26(2) obtains, as a response to the DHCP client message 34, the DHCP server message 36 en route from the DHCP server 28 to the DHCP client 22. This DHCP server message 36 includes (i) a non-option portion having the client identifier identifying the DHCP client and (ii) an option portion that echoes the option portion of the DHCP message 34. Accordingly, the DHCP server message 36 includes Relay Agent Information Options from multiple DHCP relay agents 26.

In step 210, the DHCP relay agent 26(2) changes the option portion of the DHCP server message 36 to include only the initial Relay Agent Information provided by the DHCP relay agent 26(1). The DHCP relay agent 26(2) analyzes the Relay Agent Information which it added (e.g., for authentication and authorization purposes) but excludes this from the DHCP server message 36. Accordingly, the DHCP server message 36 leaves the DHCP relay agent 26(2) with Relay Agent Information from the DHCP relay agent 26(2) stripped away.

In step 212, the DHCP relay agent 26(2) outputs the DHCP server message 36 to DHCP relay agent 26(1). The DHCP relay agent 26(1) then removes the initial relay agent information (e.g., VPI/VCI information for proper message forwarding) which it had added and then provide the DHCP server message 36 to the DHCP client 22. Further details will now be provided with reference to FIG. 6.

Figure 6:
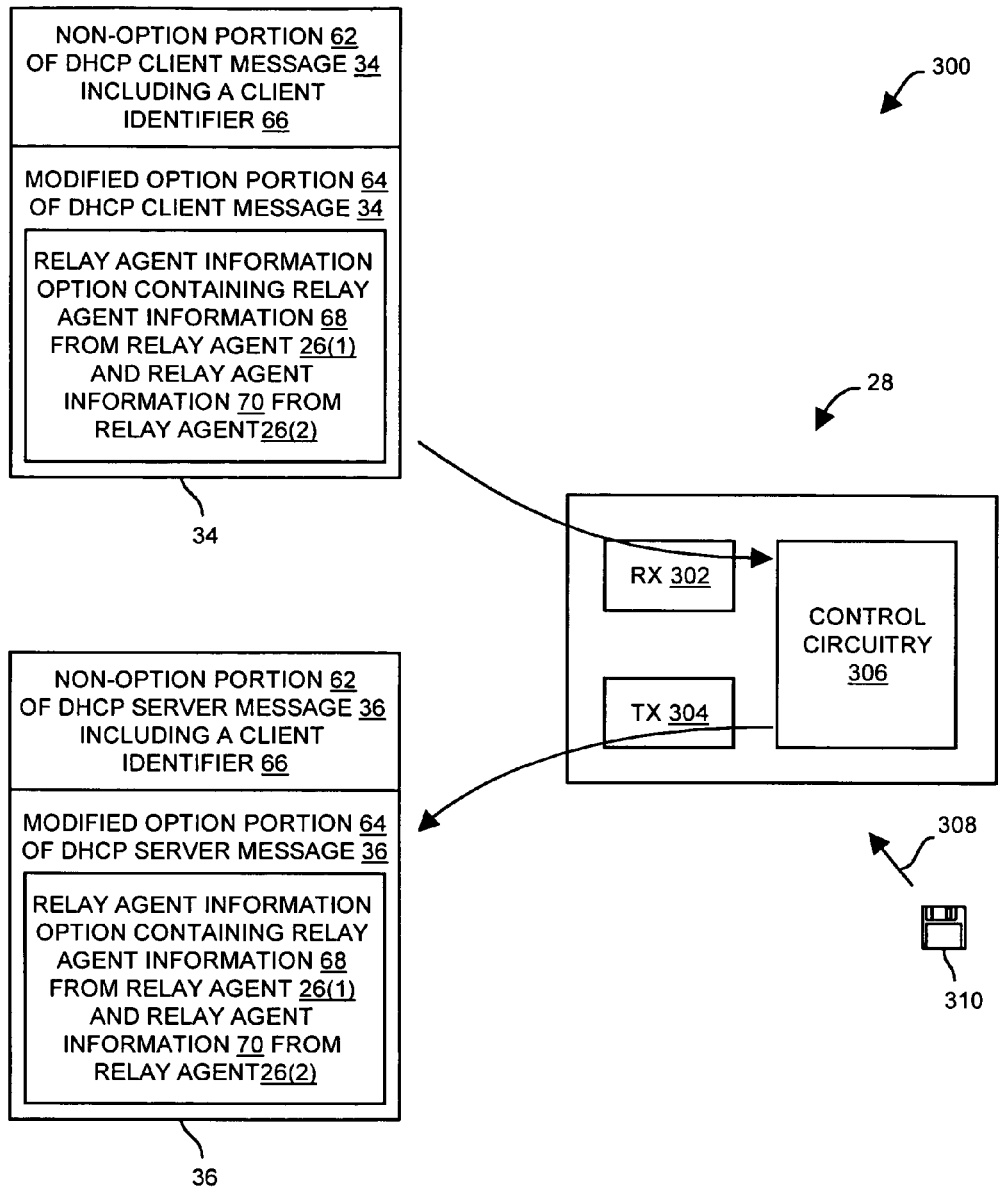
FIG. 6 is a block diagram of a DHCP server of the DHCP system of FIG. 1.

FIG. 6 is a block diagram 300 of the DHCP server 28. As shown in FIG. 6, the DHCP server 28 includes a receiver 302, a transmitter 304, and control circuitry 306 coupled to the receiver 302 and the transmitter 304. The control circuitry 306 is configured to process DHCP client messages 34 from DHCP client 22 (e.g., assign IP addresses) among other things.

In some arrangements, the control circuitry 306 includes a processor and memory in order to execute a software application 308 (illustrated by the arrow 308 in FIG. 6) to enable the control circuitry 306 to perform DHCP server operations. In these arrangements, one or more computer program products 310 deliver the application 308 to the DHCP server 28 from an external source. Although the computer program product 310 is illustrated as a diskette by way of example only, a variety of communications and storage media are suitable for use (e.g., a set of CD-ROMs, tapes, memory cards or sticks, network downloads, propagated signals, combinations thereof, etc.).

In the context of the earlier-provided example, the control circuitry 306 of the DHCP server 28 is configured to assign an IP address to the DHCP clients 22 based on ISP and VPI/VCI information which has been provided by multiple DHCP relay agents 26 via DHCP message exchanges, i.e., DHCP-DISCOVER, DHOFFER, and so on. Along these lines, the DHCP server 28 is a carrier-style device (e.g., an ISP) that performs authorization and authentication operations based on the Relay Agent Information Options obtained from the relay agents 26(1), 26(2). Furthermore, the Relay Agent Information Options are echoed in the DHCP server message 36 en route back to the DHCP client 22 thus enabling the relay agents 26(1), 26(2) to perform a variety of operations on the information on their end (e.g., authorization, authentication, forwarding, etc.) so that the DHCP client 22 properly receives the DHCP server message 36.

Specifically, the control circuitry 306 is configured to receive a DHCP client message 34 from a DHCP client 22 (also see FIG. 1) through the multiple DHCP relay agents 26 and through the receiver 302. The control circuitry 306 is configured to then generate a DHCP server message 36 (FIG. 1) based on both the relay agent information from the multiple DHCP relay agents 26, and send the DHCP server message 36 to the DHCP client 22 through the transmitter 304 and through the multiple DHCP relay agents 26. In particular, the DHCP server 28 is configured to provide IP address assignments in the non-option portion 62 of the DHCP server message 36 in a standard manner. Such operation results in a robust and reliable IP address assignment.

As mentioned above, embodiments of the invention are directed to techniques for exchanging DHCP relay agent information between multiple DHCP relay agents 26 and a DHCP server 28. Such techniques involve adapting a DHCP client message 34 to include an option portion 64 having both relay agent information from a first relay agent and other relay agent information from a second relay agent. Such techniques enable a DHCP server 34 to receive relay agent information from multiple relay agents 26 and assign an IP address to a DHCP client 22 based on this input. Accordingly, the DHCP process is capable of effectively and efficiently assigning IP addresses in a variety of new situations, e.g., to a DHCP client separated from a DHCP server 34 by a DSLAM device and a BRAS device.

While this invention has been particularly shown and described with references to preferred embodiments thereof, it will be understood by those skilled in the art that various changes in form and details may be made therein without departing from the spirit and scope of the invention as defined by the appended claims.

For example, the network elements 24(1) and 24(2) were described above as being a DSLAM device and a BRAS device, respectively, for illustration purposes only. The network elements 24(1) and 24(2) are capable being other devices as well (e.g., other devices using VRF-based DHCP, MPLS, etc.). Furthermore, with minor enhancements to the non-option portions of the DHCP messages (e.g., enhancements for managing the content of the "giaddr" field), the above-described mechanism is capable of handling relay agent information from more than two DHCP relay agents and thus providing IP address assignments which benefit from this additional information. Such modifications and enhancements are intended to belong to various embodiments of the invention.

What is claimed is:

1. In a data communications device, a method for exchanging Dynamic Host Configuration Protocol (DHCP) relay agent information with a DHCP server, the method comprising:
   receiving a DHCP message en route from a DHCP client to the DHCP server, the DHCP message including (i) a non-option portion having a client identifier identifying the DHCP client and (ii) an option portion having first relay agent information added to the DHCP message by a first relay agent;
   modifying the option portion of the DHCP message to simultaneously include both the first relay agent information added by the first relay agent and second relay agent information from a second relay agent; and
   sending the DHCP message with the modified option portion to the DHCP server;
   wherein, prior to modifying the option portion, the DHCP message includes an initial Relay Agent Information Option containing the first relay agent information added by the first relay agent;
   wherein modifying the option portion of the DHCP message to simultaneously include both the first relay agent information and the second relay agent information from the second relay agent includes providing a new Relay Agent Information Option in place of the initial Relay Agent Information Option of the DHCP message, the new Relay Agent Information Option excluding the non-option portion of the DHCP message; and
   wherein providing the new Relay Agent Information Option in place of the initial Relay Agent Information Option of the DHCP message includes:
      containing the initial Relay Agent Information Option within a first sub-option of the new Relay Agent Information Option; and
      containing the second relay agent information from the second relay agent within a second sub-option of the new Relay Agent Information Option.

2. A method as in claim 1, further comprising:
   obtaining, as a response to the DHCP message, another DHCP message en route from the DHCP server to the DHCP client, the other DHCP message including (i) a non-option portion having the client identifier identifying the DHCP client and (ii) an option portion that echoes the modified option portion which simultaneously includes both the first relay agent information and second relay agent information.

3. A method as in claim 2, further comprising:
   changing the option portion of the other DHCP message to (i) include the first relay agent information and (ii) exclude the second relay agent information; and
   outputting the other DHCP message with the changed option portion.

4. A method as in claim 3 wherein obtaining the other DHCP message includes:
   receiving, as the option portion of the other DHCP message, an echoed Relay Agent Information Option having (i) the first relay agent information contained within a first sub-option of the echoed Relay Agent Information Option and (ii) the second relay agent information contained within a second sub-option of the echoed Relay Agent Information Option.

5. A method as in claim 3 wherein obtaining the other DHCP message includes:
   receiving, as the option portion of the other DHCP message, an echoed Relay Agent Information Option having the first relay agent information and the second relay agent information integrated within a single sub-option of the echoed Relay Agent Information Option.

6. A data communications device, comprising:
   a receiver;
   a transmitter; and
   control circuitry coupled to the receiver and the transmitter, the control circuitry being configured to:
      receive, through the receiver, a Dynamic Host Configuration Protocol (DHCP) message en route from a DHCP client to a DHCP server, the DHCP message including (i) a non-option portion having a client identifier identifying the DHCP client and (ii) an option portion having first relay agent information added to the DHCP message by a first relay agent;
      modify the option portion of the DHCP message to simultaneously include both the first relay agent information added by the first relay agent and second relay agent information from a second relay agent; and
      send, through the transmitter, the DHCP message with the modified option portion to the DHCP server;
   wherein, prior to modification of the option portion, the DHCP message includes an initial Relay Agent Information Option containing the first relay agent information added by the first relay agent;
   wherein the control circuitry, when modifying the option portion of the DHCP message to simultaneously include both the first relay agent information and the second relay agent information from the second relay agent, is configured to provide a new Relay Agent Information Option in place of the initial Relay Agent Information Option of the DHCP message, the new Relay Agent Information Option excluding the non-option portion of the DHCP message; and
   wherein the control circuitry, when providing the new Relay Agent Information Option in place of the initial Relay Agent Information Option of the DHCP message, is configured to:

contain the initial Relay Agent Information Option within a first sub-option of the new Relay Agent Information Option; and contain the second relay agent information from the second relay agent within a second sub-option of the new Relay Agent Information Option.

7. A data communications device as in claim 6 wherein the control circuitry is further configured to:

obtain, as a response to the DHCP message, another DHCP message en route from the DHCP server to the DHCP client, the other DHCP message including (i) a non-option portion having the client identifier identifying the DHCP client and (ii) an option portion that echoes the modified option portion which simultaneously includes both the first relay agent information and second relay agent information.

8. A data communications device as in claim 7 wherein the control circuitry is further configured to:

change the option portion of the other DHCP message to (i) include the first relay agent information and (ii) exclude the second relay agent information; and output, through the transmitter, the other DHCP message with the changed option portion.

9. A data communications device as in claim 8 wherein, the control circuitry, when obtaining the other DHCP message, is configured to:

receive, as the option portion of the other DHCP message, an echoed Relay Agent Information Option through the receiver, the echoed Relay Agent Information Option having (i) the first relay agent information contained within a first sub-option of the echoed Relay Agent Information Option and (ii) the second relay agent information contained within a second sub-option of the echoed Relay Agent Information Option.

10. A data communications device as in claim 8 wherein, the control circuitry, when obtaining the other DHCP message, is configured to:

receive, as the option portion of the other DHCP message, an echoed Relay Agent Information Option through the receiver, the echoed Relay Agent Information Option having the first relay agent information and the second relay agent information integrated within a single sub-option of the echoed Relay Agent Information Option.

11. In a Dynamic Host Configuration Protocol (DHCP) server, a method for exchanging DHCP relay agent information, the method comprising:

receiving a DHCP message from a DHCP client through multiple DHCP relay agents, the DHCP message including (i) a non-option portion having a client identifier identifying the DHCP client and (ii) an option portion having first relay agent information added to the DHCP message by a first relay agent and second relay agent information added to the DHCP message by a second relay agent;

generating another DHCP message based on both the first relay agent information and the second relay agent information; and sending the other DHCP message to the DHCP client through the multiple DHCP relay agents;

wherein the option portion of the DHCP message includes a Relay Agent Information Option containing the first relay agent information and the second relay agent information; and wherein sending the other DHCP message includes:

outputting, as the option portion of other DHCP message, an echoing Relay Agent Information Option that echoes the Relay Agent Information Option of the DHCP message, the echoing Relay Agent Information Option having (i) the first relay agent information contained within a first sub-option of the echoing Relay Agent Information Option and (ii) the second relay agent information contained within a second sub-option of the echoing Relay Agent Information Option.

12. A Dynamic Host Configuration Protocol (DHCP) server, comprising:

a receiver;

a transmitter; and control circuitry coupled to the receiver and the transmitter, the control circuitry being configured to:

receive a DHCP message from a DHCP client through multiple DHCP relay agents and through the receiver, the DHCP message including (i) a non-option portion having a client identifier identifying the DHCP client and (ii) an option portion having first relay agent information added to the DHCP message by a first relay agent and second relay agent information added to the DHCP message by a second relay agent;

generate another DHCP message based on both the first relay agent information and the second relay agent information; and send the other DHCP message to the DHCP client through the transmitter and through the multiple DHCP relay agents;

wherein the option portion of the DHCP message includes a Relay Agent Information Option containing the first relay agent information and the second relay agent information; and wherein the control circuitry, when send mg the other DHCP message, is configured to output, as the option portion of other DHCP message, an echoing Relay Agent Information Option that echoes the Relay Agent Information Option of the DHCP message, the echoing Relay Agent Information Option having (i) the first relay agent information contained within a first sub-option of the echoing Relay Agent Information Option and (ii) the second relay agent information contained within a second sub-option of the echoing Relay Agent Information Option.

13. A method as in claim 1 wherein, the first relay agent runs on a Digital Subscriber Line Multiplexer of an Internet Service Provider and the second relay agent runs on a Broadband Remote Access Server of a network carrier.

14. A data communications device as in claim 6 wherein, the first relay agent runs on a Digital Subscriber Line Multiplexer of an Internet Service Provider and the second relay agent runs on a Broadband Remote Access Server of a network carrier.

15. A method as in claim 11 wherein, the first relay agent runs on a Digital Subscriber Line Multiplexer of an Internet Service Provider and the second relay agent runs on a Broadband Remote Access Server of a network carrier.

16. A DHCP server as in claim 12 wherein, the first relay agent runs on a Digital Subscriber Line Multiplexer of an Internet Service Provider and the second relay agent runs on a Broadband Remote Access Server of a network carrier.

17. A method as in claim 1 wherein:

the method further comprises extracting, from the initial Relay Agent Information Option stored in the DHCP message:

an initial option code field;

an initial option length field; and an initial option information field, the initial option information field storing a Virtual Channel Identifier (VCI) and a Virtual Path Identifier (VPI) associated with a Digital Subscriber Line Multiplexer (DSLAM), the DSLAM being the first relay agent;
containing the initial Relay Agent Information Option within the first sub-option of the new Relay Agent Information Option includes storing, within a sub-option information field of the first sub-option, the entire initial Relay Agent Information Option, including:
the initial option code field;
the initial option length field; and
the initial option information field, the initial option information field storing the VCI and VPI; and
containing the second relay agent information from the second relay agent within the second sub-option of the new Relay Agent Information Option includes storing, within a sub-option information field of the second sub-option, Broadband Remote Access Server information associated with the second relay agent.

18. A method as in claim 2 wherein:
the DHCP message is a DHCP Discover packet; and
obtaining the other DHCP message en route from the DHCP server to the DHCP client includes receiving a DHCP Offer packet from the DHCP server, the DHCP Offer Packet including, in a non-option portion, an Available Address field, the Available Address field storing an Internet Protocol address generated by the DHCP server based on a combination of the first relay agent information and the second relay agent information.

19. A data communications device as in claim 6 wherein:
the control circuitry is further configured to extract, from the initial Relay Agent Information Option stored in the DHCP message;
an initial option code field;
an initial option length field; and
an initial option information field, the initial option information field storing a Virtual Channel Identifier (VCI) and a Virtual Path Identifier (VPI) associated with a Digital Subscriber Line Multiplexer (DSLAM), the DSLAM being the first relay agent;
the control circuitry, when containing the initial Relay Agent Information Option within the first sub-option of the new Relay Agent Information Option, is configured to store, within a sub-option information field of the first sub-option, the entire initial Relay Agent Information Option, including:
the initial option code field;
the initial option length field; and
the initial option information field, the initial option information field storing the VCI and VPI; and
the control circuitry, when containing the second relay agent information from the second relay agent within the second sub-option of the new Relay Agent Information Option, is configured to store, within a sub-option information field of the second sub-option, Broadband Remote Access Server information associated with the second relay agent.

20. A data communications device as in claim 7 wherein:
the DHCP message is a DHCP Discover packet; and
the control circuitry, when obtaining the other DHCP message en route from the DHCP server to the DHCP client, is configured to receive a DHCP Offer packet from the DHCP server, the DHCP Offer Packet including, in a non-option portion, an Available Address field, the Available Address field storing an Internet Protocol address generated by the DHCP server based on a combination of the first relay agent information and the second relay agent information.

21. A method as in claim 11 wherein the method further comprises extracting, from the option portion of the DHCP message:
an option code field;
an option length field; and
an option information field, the option information field storing a first sub-option and a second sub-option, wherein:
the first sub-option includes, within a sub-option information field of the first sub-option, an entire initial Relay Agent Information Option, the initial Relay Agent Information Option including (a) an initial option code field, (b) an initial option length field, and (c) an initial option information field, the initial option information field storing a Virtual Channel Identifier (VCI) and a Virtual Path Identifier (VPI) associated with a Digital Subscriber Line Multiplexer (DSLAM), the DSLAM being the first relay agent; and
the second sub-option includes, within a sub-option information field of the second sub-option, Broadband Remote Access Server information associated with the second relay agent.

22. A method as in claim 11 wherein generating the other DHCP message based on both the first relay agent information and the second relay agent information includes:
generating an Internet Protocol (IP) address assignment based on a combination of the first relay agent information and the second relay agent information; and
including the IP address assignment within a non-option portion of the other DHCP message.

23. A DHCP server as in claim 12 wherein the control circuitry is further configured to extract, from the option portion of the DHCP message:
an option code field;
an option length field; and
an option information field, the option information field storing a first sub-option and a second sub-option, wherein:
the first sub-option includes, within a sub-option information field of the first sub-option, an entire initial Relay Agent Information Option, the initial Relay Agent Information Option including (a) an initial option code field, (b) an initial option length field, and (c) an initial option information field, the initial option information field storing a Virtual Channel Identifier (VCI) and a Virtual Path Identifier (VPI) associated with a Digital Subscriber Line Multiplexer (DSLAM), the DSLAM being the first relay agent; and
the second sub-option includes, within a sub-option information field of the second sub-option, Broadband Remote Access Server information associated with the second relay agent.

24. A DHCP server as in claim 12 wherein the control circuitry, when generating the other DHCP message based on both the first relay agent information and the second relay agent information, is configured to:
generate an Internet Protocol (IP) address assignment based on a combination of the first relay agent information and the second relay agent information; and
include the IP address assignment within a non-option portion of the other DHCP message.

* * * * *

UNITED STATES PATENT AND TRADEMARK OFFICE
CERTIFICATE OF CORRECTION

PATENT NO. : 7,586,912 B2
APPLICATION NO. : 11/495273
DATED : September 8, 2009
INVENTOR(S) : Anand Agarwal et al.

It is certified that error appears in the above-identified patent and that said Letters Patent is hereby corrected as shown below:

Claim 12, Column 12, Line 32, "wherein the control circuitry, when send mg the other" should read --wherein the control circuitry, when sending the other--.

Signed and Sealed this

Twenty-seventh Day of October, 2009

David J. Kappos
*Director of the United States Patent and Trademark Office*